(No Model.)

S. J. MILLER & T. R. BALLARD.
VERTICAL WINDLASS.

No. 259,571. Patented June 13, 1882.

WITNESSES:
C. Neveux
C. Sedgwick

INVENTOR:
S. J. Miller
T. R. Ballard
BY Munn & Co
ATTORNEYS.

UNITED STATES PATENT OFFICE.

SYLVESTER J. MILLER AND THEODORE R. BALLARD, OF MILLERSVILLE, ILL.

VERTICAL WINDLASS.

SPECIFICATION forming part of Letters Patent No. 259,571, dated June 13, 1882.

Application filed May 1, 1882. (No model.)

*To all whom it may concern:*

Be it known that we, SYLVESTER J. MILLER and THEODORE R. BALLARD, of Millersville, in the county of Christian and State of Illinois, have invented certain new and useful Improvements in Vertical Windlasses, of which the following is a full, clear, and exact description.

This invention relates to windlasses designed to be operated by horse or other animal power, and has more particular reference to what may be termed "reversible vertical windlasses," in which the winding-drum is loose on its rotating shaft or post, and has combined with it mechanism for engaging it with the post, so as to rotate therewith on draft being applied to the sweep, or of disengaging it from the post, so as to be free to rotate thereon, and when disengaged for applying a brake to check or control its free run on the post, if necessary.

Our invention consists in certain novel combinations and arrangements of parts whereby the action and control of the winding-drum, as described, is more perfectly secured, its support on the post is divided over duplicate bearings, and the frame which carries the windlass and pulley or sheave for its rope is supported on top by the post.

The apparatus is mainly designed for unloading hay and straw from wagons into barns, ricks, and elsewhere, and it and its frame are here more especially constructed with a view to such use; but it is also applicable to numerous other purposes, including the hoisting of dirt from shafts, excavations, or wells, and by using a suitable carrier the load may be conveyed any desired distance to its place of deposit.

Reference is to be had to the accompanying drawings, forming a part of this specification, in which similar letters of reference indicate corresponding parts in both the figures.

Figure 1:
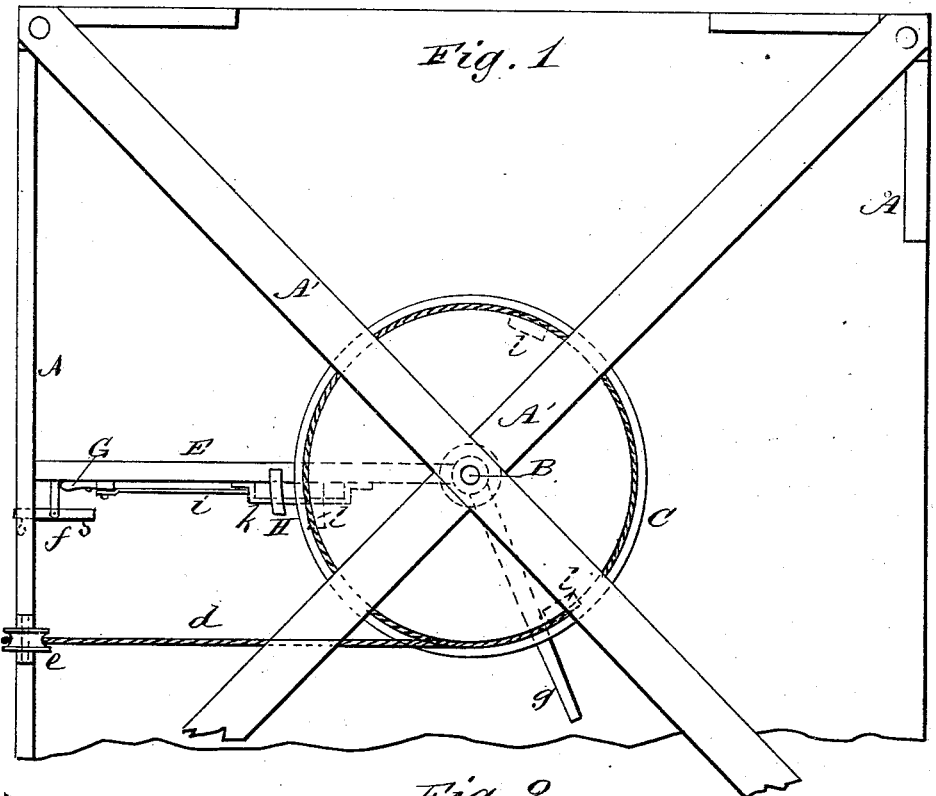
Figure 2:
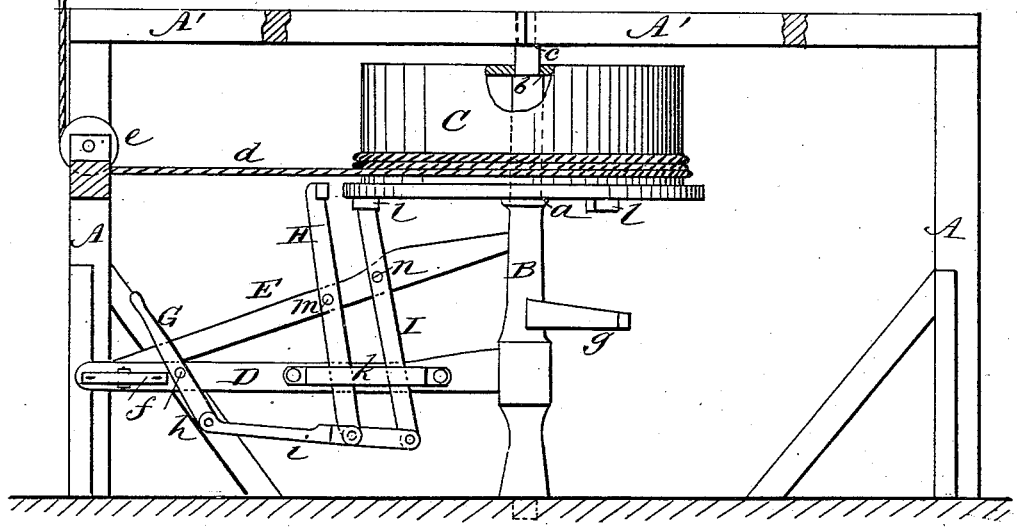

Figure 1 represents a vertical reversible horse-power windlass constructed in accordance with our invention, and Fig. 2 is a partly sectional elevation of the same.

A A' indicate the frame of the apparatus, the cross-braces A' at top serving to tie the uprights of the frame together and to form an upper support or bearing for the shaft or post B of the windlass, which also has a foot-bearing. Said post is made with three different-sized journals and corresponding number of shoulders, $a\ b\ c$, the largest one, $a$, serving for the bottom of the drum C to rotate upon, and the next one, $b$, for the top of the drum to rest and rotate upon, whereby, instead of the drum resting with its full weight on its bottom support, it has a double rest, top and bottom. The upper or smaller journal-shoulders, $c$, serve to keep the braces A' A' from resting on the drum.

The drum C, which is fitted to turn loosely on the post B, and has its winding and unwinding cord or rope $d$ passed under a sheave, $e$, for extension and use, as required, is controlled by the following combination of mechanism:

D is the sweep, connected with the post and to a whiffletree, $f$, on which the horse is hitched for circular travel around the axis of the post subject to guidance by a check-rein attached to an arm, $g$, on the post.

E is a brace connecting the outer end of the sweep with the upper part of the post.

Pivoted to the sweep at $h$ is a lever, G, within convenient reach of the driver. This lever is connected by a rod, $i$, with a lever-brake, H, and a locking-lever, I, both of which are pivoted at $m\ n$ to the brace E, and may work within a keeper, $k$, on the sweep. The lever-brake H is arranged so that when brought into action it bears against the outside of the drum C at or near its bottom, and the locking-lever I, when it is brought into action, engages with or against any one of a series of driving stops or spurs, $l$, on the bottom of the drum at or near its outer periphery.

The general action of these devices is similar to that of other vertical windlasses in which a loose drum is used and engaged with or disengaged from its shaft or post at the pleasure of the attendant or as circumstances require, and so that when disengaged the horse may continue its walk without exerting any effect and the drum be free to lower or unwind, or else be under check by the brake; also in which, when the brake is disengaged, the device for locking the drum may by the same motion be put into action, and vice versa—that is, when the brake is engaged the drum is released from its lock with the post; but by our arrangement it will be observed that the greatest possible facility is afforded for putting the drum into lock with the post almost at any time, without waiting for a particular part of the drum to come round, or, rather, for putting the locking-lever I into its engaging position by reason of said lever, which is pivoted to the brace of the sweep, having a locking connection with the drum near its outer periphery, and the great distance apart of the spurs *l*, against which it presses. Such outer connection of the drum, too, with the locking device gives a better leverage and enables the drum to carry a heavier load. The disposition, also, of the lever-brake H causing the brake to act upon the outer periphery of the drum insures the most effective application for the brake.
Having thus described our invention, we claim as new and desire to secure by Letters Patent—

1. The combination, with the loose drum C, having one or more driving-stops, *l*, on its bottom, near its periphery, the vertical rotating post B, and the sweep D, of the lever-brake H, arranged to act upon the outer periphery of the drum, the locking-lever I, arranged to act upon the stops *l*, and the hand-lever G, with its connecting-rod *i*, all of said levers being pivoted to the sweep or brace therefrom, for operation in relation with each other and the drum, substantially as specified.

2. The combination, with the loose drum C and frame cross-braces A', of the vertical shaft or post B, constructed with three upper journals having shoulders *a b c*, whereby the weight of the drum is supported both above and below, and the cross-braces A' are restrained from resting on the drum, essentially as shown and described.

SYLVESTER J. MILLER.
THEODORE R. BALLARD.

Witnesses:
JOHN A. MILLER,
ALVIN W. BALDRIDGE.